US006357397B1

(12) United States Patent
Kull et al.

(10) Patent No.: US 6,357,397 B1
(45) Date of Patent: Mar. 19, 2002

(54) AXIALLY CONTROLLED ROTARY ENERGY CONVERTERS FOR ENGINES AND PUMPS

(76) Inventors: Leo Kull; Raivo Leo Kull, both of 58 Westover Ave., W. Caldwell, NJ (US) 07006

( * ) Notice: Subject to any disclaimer, the term of this patent is extended or adjusted under 35 U.S.C. 154(b) by 0 days.

(21) Appl. No.: 09/565,741

(22) Filed: May 8, 2000

(51) Int. Cl.$^7$ .............................................. F02B 53/00
(52) U.S. Cl. .................... 123/18 R; 417/269; 417/481
(58) Field of Search ........................ 123/18 R; 417/481, 417/486, 269

(56) References Cited

U.S. PATENT DOCUMENTS

| | | | |
|---|---|---|---|
| 1,003,800 A | | 9/1911 | Rodigin |
| 3,801,237 A | | 4/1974 | Gotthold ...................... 418/36 |
| 3,974,801 A | * | 8/1976 | Brown ...................... 123/18 R |
| 4,022,167 A | | 5/1977 | Kristiansen .................. 123/43 |
| 4,287,858 A | | 9/1981 | Anzalone ..................... 123/43 |
| 4,401,070 A | | 8/1983 | McCann ..................... 123/229 |
| 4,539,941 A | * | 9/1985 | Wang .......................... 123/18 R |
| 5,103,778 A | | 4/1992 | Usich ........................... 123/58 |
| 5,209,190 A | | 5/1993 | Paul ............................. 123/43 |
| 5,429,084 A | | 7/1995 | Cherry ....................... 123/243 |
| 5,501,182 A | | 3/1996 | Kull ............................ 123/18 |
| 5,813,372 A | | 9/1998 | Manthey ...................... 123/43 |
| 6,186,098 B1 | * | 2/2001 | Choi ......................... 123/18 R |

OTHER PUBLICATIONS

F. Wankel: Rotary Piston Machines, ILIFFE Books, Ltd. London 1965 Mazda Rotary Engine Manual by Bill Carrol.

* cited by examiner

Primary Examiner—Hoang Nguyen

(57) ABSTRACT

An axial bevel gear generated control motion is used to control an accelerating-decelerating vane motion in a cylindrical central axis main pressure chamber using a limited angle differential gear whose reversing gear is receiving an axial crank controlled motion from an orbiting bevel gear or in a modified version from an oscillation controlling barrel cam. Same bevel gear crank generated axial motion is also used to provide an axial piston motion in cylinders with one or more pistons which can be in a stationary or rotating cylinder housing. In all the different models a valveless port communication with a radial or axial flow distribution control is used for a pressurized fluid flow which is suited to external pressure or internal combustion engines where the energy conversion is from a fluid or combustion pressure to a powered output shaft rotation or in a reverse energy conversion mode, the central shaft is functioning as a power input shaft for pumping or gas compressor applications. For different vane numbers and axial motion generation gear ratios as well as engine or pump types, different communication hole patterns on a distributing stator or rotor are used.

28 Claims, 5 Drawing Sheets

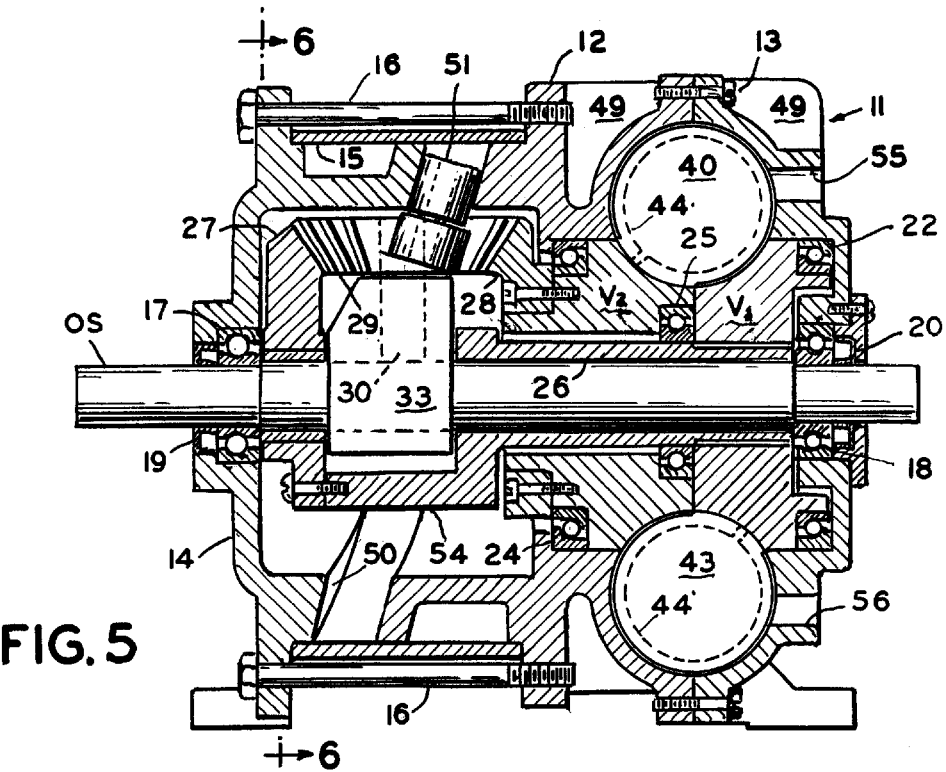
FIG. 5
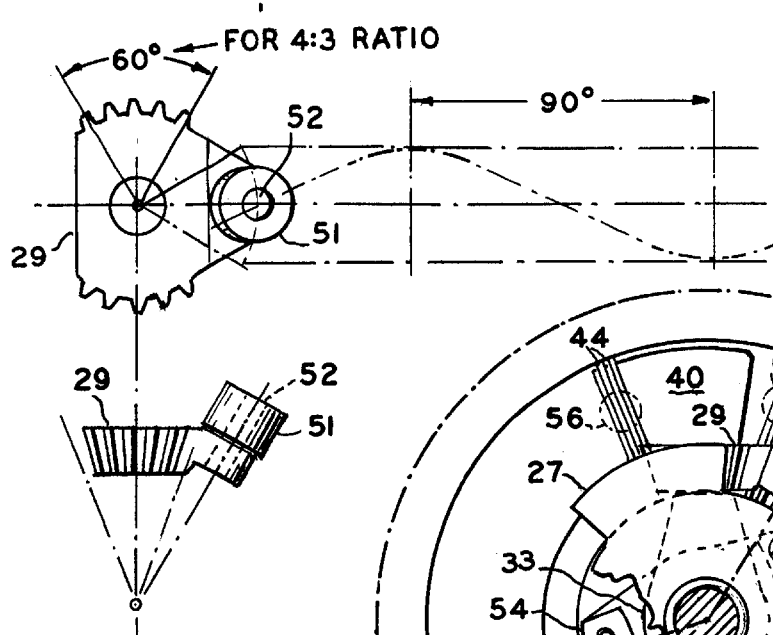
FIG. 7
FIG. 8
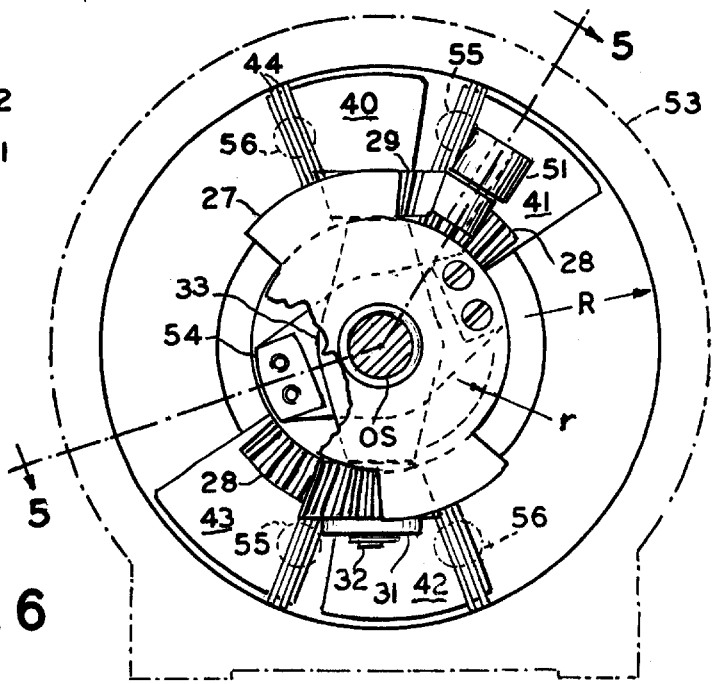
FIG. 6

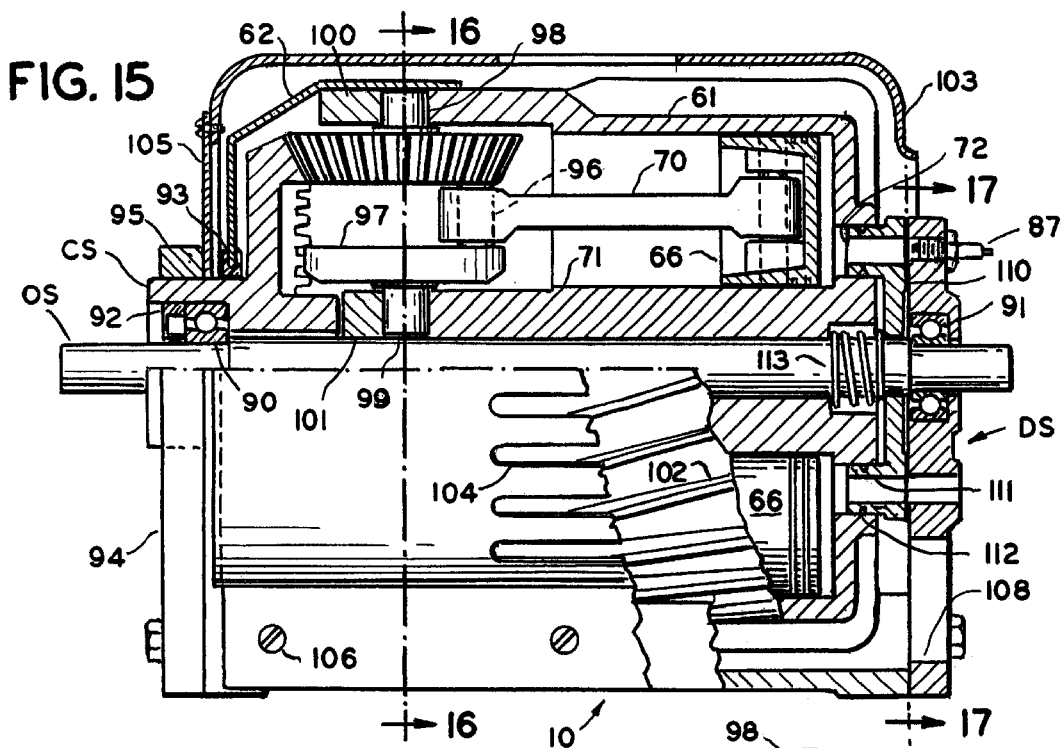
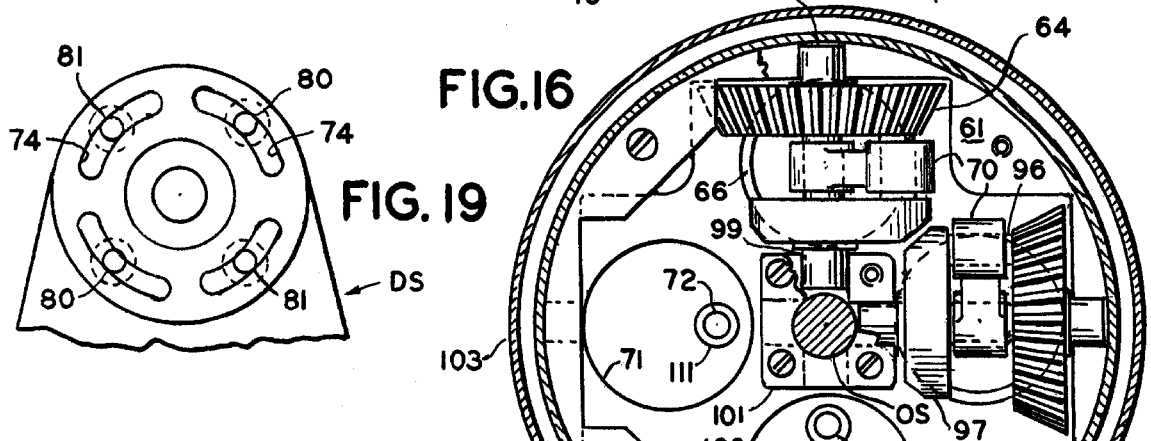
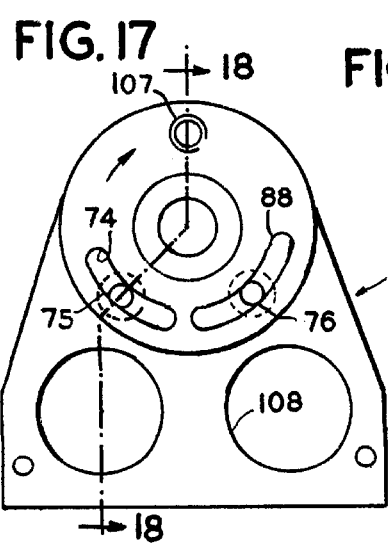
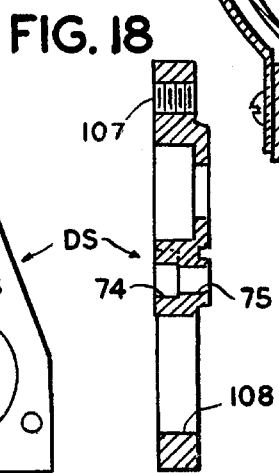
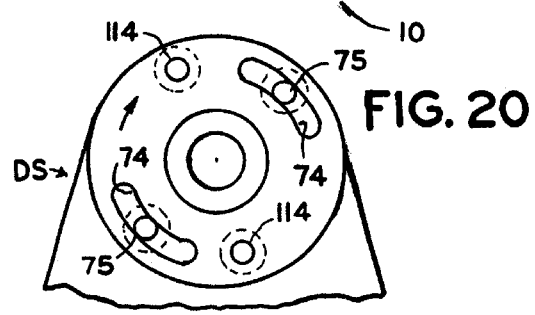

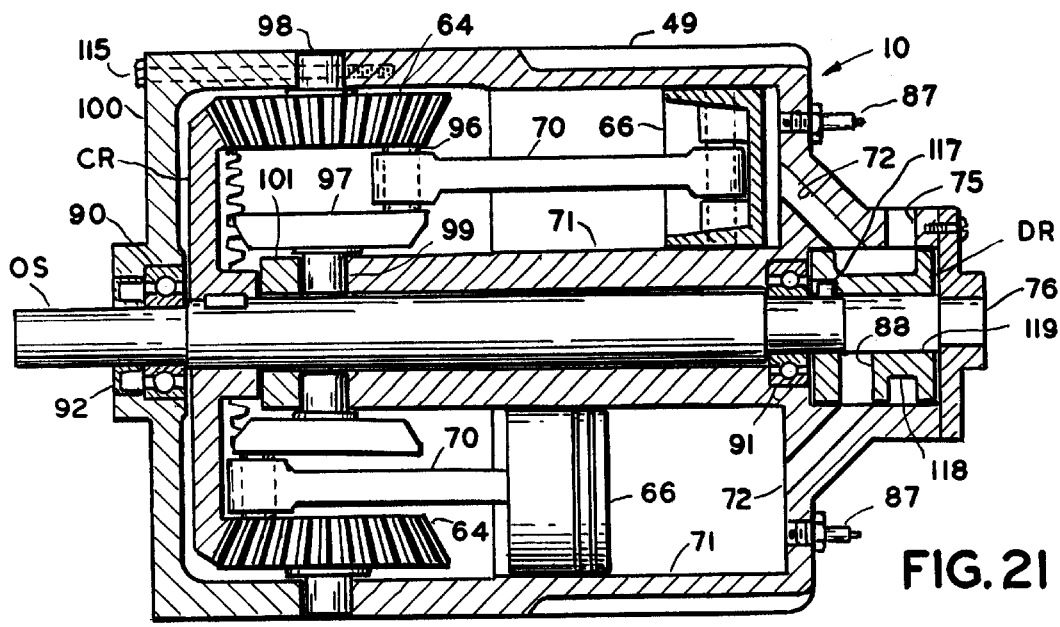

AXIALLY CONTROLLED ROTARY ENERGY CONVERTERS FOR ENGINES AND PUMPS

BACKGROUND OF THE INVENTION

1. Field of the invention

This invention relates to rotary variable volume control devices for engines and pumps where axial reciprocation is created by the rotation of a central operating shaft.

2. Description of the prior art

In the axially controlled rotary engine class axial piston or vane motion is usually created by stationary cam surfaces which convert a rotary motion to an axial motion which is used to create variable volume pressure chambers in cylinders or compartments.

Among the numerous cam controlled axial piston engines the latest examples are found in U.S. Pat. Nos. 5,813,372 of Manthen, 5,209,190 of Paul, 4,287,858 of Anzalone and 4,022,167 of Kristansen. While most of these patents have a positive cam groove action, in U.S. Pat. No. 5,812,372 a somewhat simpler construction is shown, but the non-positive axial cams require a spring loaded cam follower action for engine starting.

In U.S. Pat. No. 5,429,084 of Cherry, cam operated axially sliding vanes are used to create variable volume pressure chambers. Though this concept is relatively simple, sealing and pressurized vane sliding are creating rather difficult problems to make this a wider scale practical solution. In U.S. Pat. No. 3,801,237 of Gotthold a bevel-gear-type vane control is shown, but in this two-ended control mechanism complexities, manufacturing difficulties and strength requirements/re its drawbacks.

DESCRIPTION OF THE PRIOR ART

In the axially controlled rotary engine class axial piston or vane motion is usually created by stationary cam surfaces which convert a rotary motion to an axial motion which is used to create variable volume pressure chambers in cylinders or compartments.

Among the numerous cam controlled axial piston engines the latest examples are found in U.S. Pat. Nos. 5,813,372 of Manthen, 5,209,190 of Paul, 4,287,858 of Anzalone and 4,022,167 of Kristansen. While most of these patents have a positive cam groove action, in U.S. Pat. No. 5,812,372 a somewhat simpler construction is shown, but the non-positive axial cams require a spring loaded cam follower action for engine starting.

In U.S. Pat. No. 5,429,084 of Cherry, cam operated axially sliding vanes are used to create variable volume pressure chambers. Though this concept is relatively simple, sealing and pressurized vane sliding are creating rather difficult problems to make this a wider scale practical solution. In U.S. Pat. No. 3,801,237 of Gotthold a bevel-gear-type vane control is shown, but in this two-ended control mechanism complexities, manufacturing difficulties and strength requirement are its drawbacks.

Bevel gears or bevel-gear-type differentials are used in various other rotary engine concepts for creating an oscillating vane motion in stationary cylindrical pressure chambers with a stationary vane set. Wang in his U.S. Pat. No. 4,539,941 is using opposing half-circular sector gears on an output shaft to convert an oscillating vane and bevel gear motion to a uniform speed output shaft rotation while Choi in his U.S. Pat. No. 6,186,098 is using a modified Scotch yoke principle where the ordinary power transmission slot and pin connection requires an extra complexity to transmit the rotary powered slot oscillation to a uniform motion bevel gear in mesh with another one on a perpendicular output shaft.

Brown in his U.S. Pat. No. 3,974,801 is using cylinders and pistons mounted on a rotating disk where the Piston reciprocation is created by a special ratio changing gear pair in a gear train which includes a differential gear for power output.

As becomes apparent later, in our disclosure crank pins are used on bevel gears or bevel-gear-type differentials in a novel-way to generate compound axial and rotating motions for controlling variable speed unidirectional vane rotations or axial piston reciprocations in ordinary cylinders.

SUMMARY OF THE INVENTION

The term "rotary energy converter" can be applied to a large variety of devices where a variable volume pressure chamber is created in many different ways by a shaft rotation for the purpose of changing the pressure energy to a powered shaft rotation or in the reverse manner to convert a powered shaft rotation to a fluid pressure energy as found in pumps or compressors.

In our U.S. Pat. No. 5,501,182, titled "Peristaltic Vane Device for Engines and Pumps" a radial rotating control motion is used to control the acceleration and deceleration of vanes in a main pressure chamber. The word peristaltic was used because of the similarity of flow characteristic as found in our digestive system. Therefore the words peristaltic wave, peristaltic step and peristaltic step factor are used again for various features. While the same differential gear controlled vane motion or peristaltic motion is found in the present invention, the variable motion controlling crankpin is on a bevel gear to provide an axial link connection to the reversing gear of a bevel-gear-type differential which provides same kind of vane acceleration-deceleration as the side gear control from the orbiting crank in our above mentioned invention. (FIGS. 17 and 18 where a toroidal pressure chamber is also shown as found in this invention.)

In a modified configuration the axially controlled crankarm of the reversing gear could have also a direct barrel cam control without the bevelgear control linkage which is reducing the length of this model.

In a somewhat different version of this invention the same bevel gear generated axial motion is readily applied to reciprocate the ordinary pistons in cylinders. Again,the application flexibility is possible here which includes rotating and stationary pressure chambers or cylinder blocks, engine or pumping versions, reversibility and self starting in steam engines and a choice of radial or face-to-face communication.

It has been recognized that most rotary engines are more compact and lighter than the in-line-piston engines but besides the size advantage the advantages listed for Wankel rotary engines are applicable also for our rotary engines: low weight to HP ratio, smooth vibrationless operation, quiet running, low cost and simplicity and no poppet valves are reducing friction and make the fresh charge and exhaust more effective.

Thus the general object in the present invention is to provide an axial control motion applicable to control the acceleration and deceleration of vanes in a main pressure chamber or using this axial motion to directly reciprocate ordinary pistons in cylinders to create variable volume pressure chambers for engine or pumping applications.

A more specific object in vane-type differential gear controlled rotary energy converters is using the reversing gear of the differential for linking a bevel gear orbiting crank controlled oscillation to an arm on said reversing gear which is in a limited angle mesh with side gears of the differential which is controlling the acceleration and deceleration of the vanes.

In another modified version the reversing gear crank arm on said differential gear controlled vane-type energy converter is functioning as a cam follower for a barrel-type cam groove which is controlling the acceleration and deceleration of vanes.

Another modified object is to use said bevel gear generated axial motion for axially reciprocating ordinary pistons in a rotating cylinder barrel for engine or pumping applications.

In a similar modified version said bevel gear generated axial motion is applied to reciprocate said pistons in a stationary cylinder block in which case the operating shaft is secured to the controlling bevel gear and to a rotating communication member which can have a radial or axial face-to-face port communication with stationary ports.

A further object in said piston-in-cylinder version for steam or external pressure engines is to provide self starting and reversibility options for cylinder numbers 2 or more.

A more detailed object for piston-type versions is to provide communication members adapted to any piston numbers or bevel gear ratios in steam and internal combustion engines, pumps and compressors.

A final general object is to provide constructional details for satisfying strength and bearing requirements and to offer relatively simple and compact positively controlled transmission options suited for engine and pumping applications of any size.

BRIEF DESCRIPTION OF DRAWINGS

These and further features and advantages will become more apparent from the following detailed description when taken in conjunction with the accompanying drawings which illustrate the most typical, somewhat different, but basically very similar axial control version for central axis vane control and reciprocating piston control wherein:

FIG. 5 is a cross sectional view similar to FIG. 1 but taken along the line 5—5 of FIG. 6 for a barrel-cam controlled differential gear;

FIG. 6 is a partial cross sectional view taken along the line 6—6 of FIG. 5 to illustrate the relationship of the differential gear;

FIG. 7 is a detailed geometrical top view of the reversing gear with the cam follower moving range and peristaltic wave;

FIG. 8 is the side view of FIG. 7;

FIG. 15 is a partial cross sectional view of a 4-cylinder internal combustion piston engine with a rotating pressure chamber;

FIG. 16 is a cross sectional view taken along the line 16—16 of FIG. 15;

FIG. 17 is a detailed view looking in the direction of line 17—17 of FIG. 15 to show the communication hole pattern for an internal combustion engine;

FIG. 18 is a cross section taken along the line 18—18 of FIG. 17;

FIG. 19 is showing a communication hole pattern for a double action external pressure engine or pump;

FIG. 20 shows a communication hole pattern for a compressor;

FIG. 21 a sectional view of an internal combustion piston engine with stationary pressure chambers which are partly taken along the line 21—21 of FIG. 22;

FIG. 22 is a partly fragmentary end view of FIG. 21 but showing a face-to-face communication instead of the radial one in FIG. 21;

FIG. 23 is a partial sectional view taken along the line 23—23 of FIG. 22;

FIGS. 24 and 25 show the communication passages for the drum-type communication shown in FIG. 21 whereby the sectional view of FIG. 25 is taken along the line 25—25 of FIG. 24;

FIGS. 26 and 27 show the details of the disk for a face-to-face communication in FIGS. 22 and 23 whereby the section in FIG. 27 is taken along the line 27—27 of FIG. 26 and FIG. 28 is a communication disk for a valveless compressor.

DESCRIPTION OF THE PREFERRED EMBODIMENTS

Figure 1:
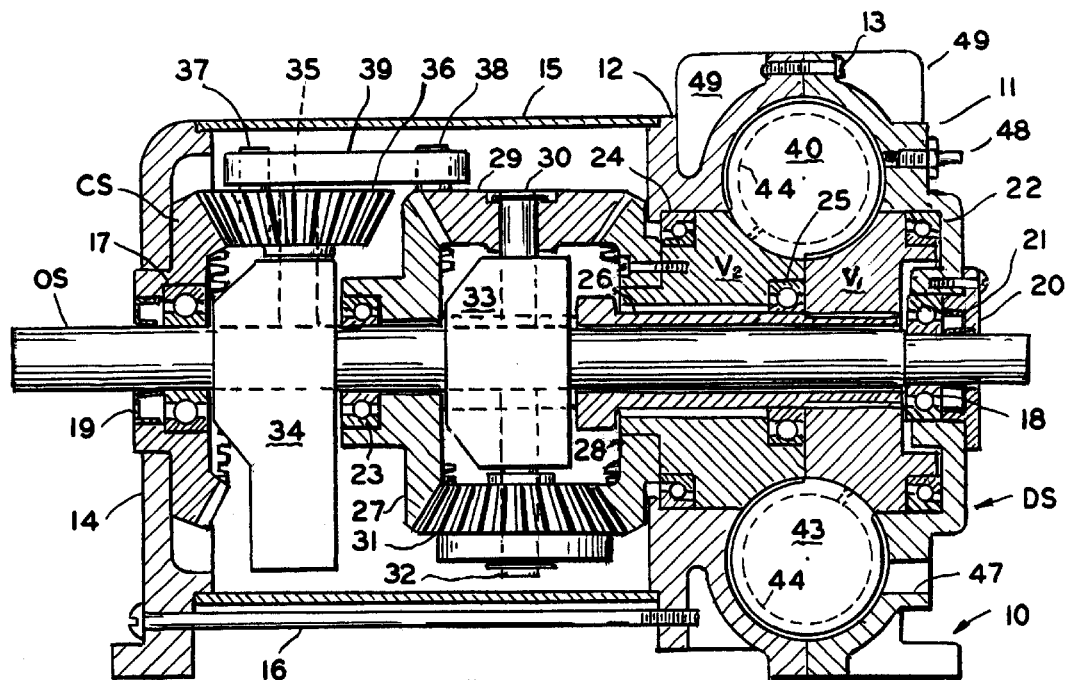
FIG. 1 is a cross sectional view for differential gear and orbiting crank controlled peristaltic vane motion.

All the following preferred embodiments are somewhat similar central-axis models where the control element is an axial motion which can be applied to vane-type or piston-type versions. Because of this similarity same reference symbols are used for same common function parts.

Vane-type Energy Converters

In FIGS. 1–8 a limited angle differential control method is applied to control the alternately accelerating-decelerating vane rotation in a central-axis main pressure chamber which is illustrated as a toroidal pressure chamber for round vanes with a piston ring sealing. Any of the stationary or rotating pressure chamber configuration can be used here in conjunction with the illustrated differential gear control which has basic similarities to the one shown in FIG. 32 of our U.S. Pat. No. 5,501,182.

In this central-axis version the common parts are a base member 10, consisting of two main pressure chamber halves 11 and 12, held together by screws 13, an end plate 14 and a sleeve or cylindrical section 15 clamped together by bolts 16. A central operating shaft OS is rotatably supported by ball bearings 17 and 18 including shaft seals 19 and 20 and a bearing retainer 21 for bearing 18. One of the vane carriers $V_1$ is rotatably supported by a radial-thrust bearing 22 and a bearing 23 on shaft oS while the other vane carrier $V_2$ has a radial-thrust bearing 24 and a bearing 25 on a hollow shaft 26 which has a splined or keyed fit to vane carrier $V_1$. Shaft 26 has a forked end to connect the vane carrier $V_1$ to a differential side gear 27. Instead of the illustrated ball bearings, needle or plain sleeve bearings could be used for similar less demanding applications. Another side gear 28 is secured to vane carrier $V_2$ and a reversing bevel gear 29, rotatably mounted to a stud 30, is providing a differential linkup between vane carriers $V_1$ and $V_2$. A second bevel gear 31 on a stud 32 could be used to increase the power transmission strength and to provide an axial balance, whereby studs 30 and 32 are secured to a block 33 carried by shaft OS.

Another mounting block or crankarm 34, secured also to the shaft OS, has a stud 35 for rotatably supporting a bevel gear 36 in mesh with a stationary bevel gear or a control stator CS which is secured to end plate 14. Studs 3o and 35 are forming a base link on a four-bar-linkage whose cranks are a rotating crankpin 37 on gear 36 and an oscillating crankpin 38 on reversing gear 29 whereby these crankarms are linked together by an axially oscillating connecting link 39.

Figure 3:
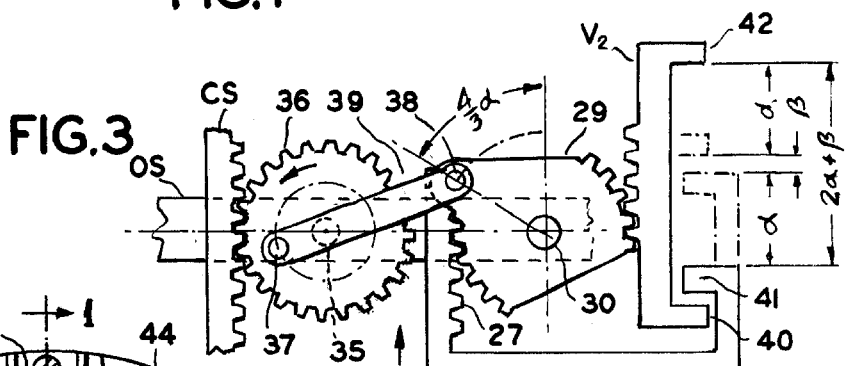
FIG. 3 illustrates a kinematic geometry for variable motion vanes.

The top view of this four-bar-linkage and the differential control elements are geometrically illustrated in FIG. 3 where the rotating kinematics is shown in a one-plane developed view. While the controlling bevelgear ratio between gears 36 and CS has to be 2:1 for a 4-vane model, any suitable differential gear ratio can be selected. In FIG. 3 a 4:3 ratio is shown which makes the reversing gear smaller than the side gears 27 and 28 and the oscillating angle 60° to produce a 45° ($\alpha$) reverse oscillation to side gears 27 and 28 which again provide a 90° (2$\alpha$) relative vane motion during the full revolution of crankpin 37.

In the actual rotating mode during the 90° rotation of shaft OS the 180° rotation of gear 36 is translated to the 45° reversing rotation of $V_1$ and $V_2$ but since stud 30 is also rotating with shaft OS, $V_1$ will rotate or accelerate 90°+45°=135° and $V_2$ will decelerate 90°−45°=45°. In a 4-vane model this is producing four 90° volume changes between all the adjacent vanes or in all the four subchambers.

Figure 4:
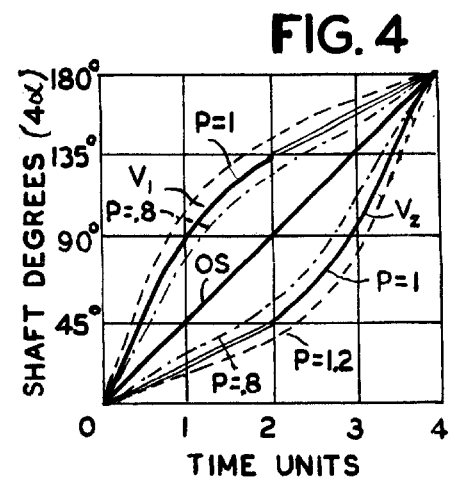
FIG. 4 is a basic acceleration-deceleration chart for the peristaltic motion.

The rotational relationship of the three concentric shafts OS, $V_1$ and $V_2$ is plotted in FIG. 4 on a shaft degrees vs a suitable time scale. The uniform rotation of the operating shaft OS is shown as a straight line diagonal while the accelerations of vane carrier shafts $V_1$ and $V_2$ are shown in full lines and their deceleration in double lines. In this chart all the three shafts are starting with the same speed and while the shaft OS maintains its uniform speed, $V_1$ will start its acceleration and $V_2$ its deceleration. Thus during the first 90° rotation of shaft OS $V_1$ has rotated 135° and $V_2$ 45° giving a rotational 90° change between them and during the next 90° rotation of shaft OS the opposite will happen which means on the midpoint in FIG. 4 all the speeds are same again because the curves are parallel-and then the reverse acceleration-deceleration of $V_1$ and $V_2$ will cause again a 90° volume change in the opposite way. In a 4-vane model this 3:1 or 135°:45° moving relationship with four 90° volume changes between adjacent vanes means that the full 360° toroidal pressure chamber volume is usable for energy conversion. For this relationship where $\alpha$ is 45° for the 4-vane models, a peristaltic step factor P=1 can be used as explained in our U.S. Pat. No. 5,501,182. Theoretically, however, P could have a range of 0–2 which practically means that for 0 there is no relative motion between vanes and for the theoretical maximum of 2 the vane thickness has to be reduced to 0 which practically is not possible. In FIG. 4 P=0.8 is shown in phantom lines and P=1.2 in dotted lines. P=0.8, for instance is a volume reducing factor which means for maintaining same displacement as for P=1, P=0.8 requires a slight increase of the vane diameter and the overall size increase of the model.

Figure 2:
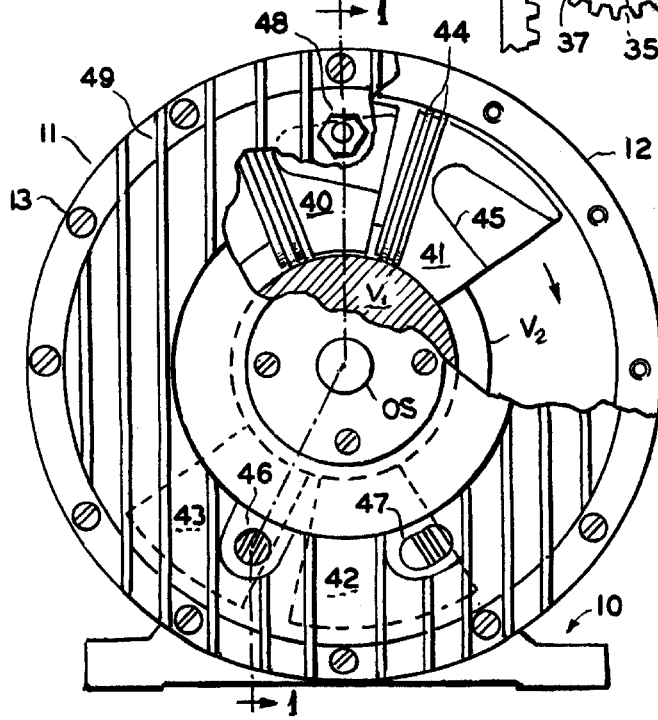
FIG. 2 is a partially fragmentary end view of FIG. 1.

In FIG. 2 a fragmentary end view of an internal combustion engine is shown where vanes 41 and 43 are secured to vane carrier $V_1$ and vanes 40 and 42 are secured to $V_2$. All the vanes have a good working clearance in the toroidal pressure chamber but each vane has 2 piston rings 44 freely seated in grooves but their ordinary split ring design allows a spring biased tight contact against the mating wall in the toroidal pressure chamber formed by stationary sections 11 and 12 and vane carriers $V_1$ and $V_2$. The vane shape and piston ring grooves can be designed in many different ways as a symmetrical design with piston rings in center or an unsymmetrical illustrated design where all the rings are on one side of vanes which in their closest position with a step factor P=1, are 45° apart for 4-vane models. In order to get a specified compression ratio for internal combustion engines, a part of the volume between vanes has to be filled with vane thickness. For illustrative purposes in FIG. 3 the minimum space between vanes is and the maximum is 2$\alpha$+$\beta$ The compression ratio is then:

$$\frac{2\alpha + \beta}{\beta}$$

In actual case, however, a cavity or unrestricted passage 45 is provided on the sides of vanes to allow a free port communication. This small volume increase is compensated by additional vane thickness.

A typical port pattern for internal combustion engines is shown in FIG. 2 for a clockwise rotation. Port 46 is for air-fuel intake and a wider port 47 is for exhaust while an ignition point is shown on an upper vertical line. This can be a spark plug 48 or an injection port for higher compression ratio self ignition which is a common practice for Diesel engines. The piston rings 44 on vanes 40 and 41 are shown in their closest position for a timed spark ignition of the compressed air-fuel mixture which starts the epansion cycle which is causing a 90° power stroke during which vane 41 will rotate 135° and vane 40 45° as previously mentioned. In same time the vane 43 whose piston rings 44 are visible through the inlet port 46, will rotate also 135°, but because of the 45° rotation of vane 42, there is a 90° volume increase between them for a suction-type air-fuel intake. After the intake, a 90° volume reduction or compression will follow before ignition while same kind of volume reduction in the opposite subchamber will force out the exhaust gases through port 47 which opens just before the end of power stroke similarly to the timing of exhaust valves in ordinary piston engines. For lubrication any known method can be used and for cooling, fins 49 are added to the toroidal pressure chamber halves 11 and 12 which can receive an extra cooling air flow from fan blades rotated by the shaft OS.

In FIGS. 5–8 a barrel-cam control version is illustrated where same pressure chamber and differential gear control is shown as just described. The only difference here is that instead of the crank controlled axial motion to the reversing gear 29, a cam groove generated axial control motion or oscillation is used. A 4:3 ratio between the limited angle reversing gear 29 and side gears 27 and 28 is shown again which means the oscillating range for the gear 29 is 60° while for the side gears 27 and 28 it is again 45° ($\alpha$) for a peristaltic step factor P=1.

A cam groove 50 in housing sections 12 and 14 is machined to suit a cam follower roller 51, rotatably mounted on a stud 52 which has its centerline coinciding with the geometric centerpoint of the bevel gear cone on the centerline of shaft OS. This cam groove in sections 12 and 14 can be conveniently machined without sleeve 15 when these sections are internally clamped together and a 3-axis machining setup is used whereby same setup could be used for machining the seat for sleeve 15 to insure a precise final assembly. The cam groove 50 has to produce four 9° oscillations for a 4-vane model which is practically same as the crank controlled oscillations in FIGS. 1–4. The center of the cam profile is graphically shown in FIG. 7 where during 2α (90° for P=1) the 60° oscillation is produced with a rather smooth cam angle because of the relatively large barrel diameter.

While in the orbiting crank controlled versions (axial or the previously described radial orbiting crank in our U.S. Pat No. 5,501,182) a sinusoidal or harmonic-motion acceleration-deceleration curves of FIG. 4 are produced, in radial or in the present axial cam controlled versions the cam control offers a design freedom to modify these curves slightly to suit different application requirements.

The limited angle differential gear and vane relationship (same for FIGS. 1 and 2) is shown in a "transparent view" in FIG. 6 where the overall end view shape is shown in phantom lines 53 and the O.D. of the toroidal main pressure chamber is indicated by R and the I.D. by r. The mounting block 33 on shaft OS is rotatably supporting again the reversing gear 29 with its cam follower roller 51 and another bevel gear 31. The yoke 54 of the hollow shaft 26, as shown in the sectional view of FIG. 5, is linking the side gear 27 and vane carrier $V_1$ with its two vanes 41 and 43 together while the side gear 28 is secured to the vane carrier $V_2$ with its vanes 40 and 42. Since this differential is a limited angle sector-gear-type, the 45° rotational freedom between shaft OS and vane carrier $V_1$ makes possible to use the yoke connection to provide the 45° working clearance between the yoke 54 and block 33. The illustrated vane position is same as shown in FIG. 2 and also the differential gear position is same as in FIG. 3 where vane 41 starts to accelerate to increase the volume between vanes 40 and 41 as well as between vanes 42 and 43. Same internal combustion hole pattern of FIG. 2 could be used here but a double action hole pattern for external pressure (steam) or pumping versions is ahown in dotted lines in FIG. 6 where opposing holes 55 can function as inlet ports and holes 56 as outlet ports.

The similar models in FIGS. 1 and 5 can be easily converted to higher vane numbers with 3 or any other higher number of vanes on each vane carrier whereby the number of vanes on each vane carrier will equal the control gear ratio in orbiting crank models or the total number of vanes in a model equals the number of cam controlled oscillations or peristaltic steps during a revolution of the operating shaft OS.

Axial Control Method for Reciprocating Pistons

Figures 9, 10:
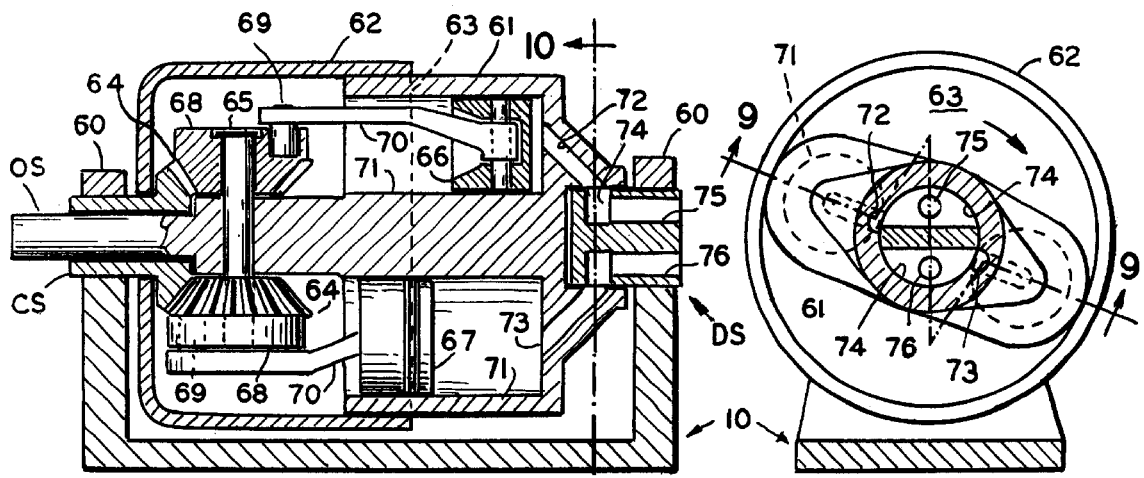
FIG. 9 is a cross sectional view of a 2-piston engine or pump taken along the line 9—9 of FIG. 10.
FIG. 10 is a cross sectional view of FIG. 9 taken along the line 10—10 of FIG. 9.

The basic axial motion generation for axially reciprocating pistons in cylinders, as illustrated in FIGS. 9–28, is same as the one shown in FIG. 1. Therefore some of the designating characters are used again for same function parts. In FIGS. 9 and 10 the simplest axial piston rotary energy converter is illustrated where the operating shaft OS is rotatably supported in a U-shaped base 10 which has clamps 60 to mount a control stator bevel gear CS and a distributing stator DS. Shaft OS is also shown as part of a cylinder block 61 which has a rotating bearing fit on the distributing stator DS. A cylindrical cup-shaped cover is secured to a round heavier section 63 of cylinder block 61 which is also functioning as a flywheel. Cover 62 has a central hole or rotating fit on the control stator CS. The bevel gear generated axial rotating reciprocation is same as shown in FIG. 1 but a 1:1 ratio is used between the stationary bevel gear or control stator CS and mating gears 64 which are rotatably supported on a shaft 65, perpendicularly secured to shaft OS. While there are many ways to provide a crank connection to pistons 66 and 67, in FIG. 9 a hub 68 on gear 64 with a bearing hole is used for crankpins 69 which are secured to connecting rods 70 for providing the ordinary connection to pistons 66 and 67 in cylinders 71 which have angular communication holes 72 and 73 to reach the distributing stator DS. In this 1:1 gear ratio model with any number of cylinders, the distributing stator DS has a distributing hole pattern consisting of two opposing 180° communication passages 74 to alternately connect holes 72 and 73 to an inlet port 75 and an outlet port 76.

For starting this 2-piston engine, the cylinder block 61 has to be in a non-deadcenter position because in the deadcenter position the crankpins 69 do not allow a power transmission and holes 72 and 73 are momentarily closed. In FIGS. 9 and 10 the shaft OS with cylinder block 61 is shown few degrees past the deadcenter position allowing the fluid power to apply pressure,to piston 66 through inlet port 75, passage 74 and hole 72. In same time piston 67 will push the used fluid power out through hole 73 and port 76. After a 180° rotation the pistons will be in the opposite position where piston 67 is starting to receive its 1800 power stoke from the inlet port 75. This model can work also as a less advantageous 1-cylinder engine with a 180° power stroke and a following 180° outlet stroke which is using the flywheel stored energy for a continued rotation. Because of the 1:1 gear ratio it cannot work as an internal combustion engine.

Figure 11:
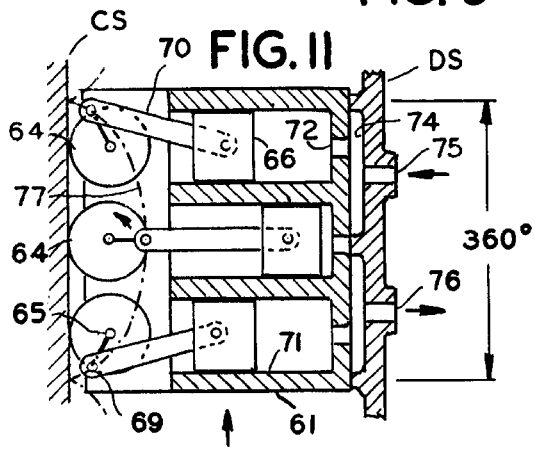
FIG. 11 is a developed schematic illustration of a 3-cylinder steam engine or pump.

In FIG. 11 the kinematic rotational relationship of a 3-piston engine is schematically shown in a one plane developed illustration using same components. The control stator or bevel gear CS is shown in mesh with three gears 64 with their crankpins 69 in a 120° relationship. If these crankpins are on the pitchline of gears 64, they are following a common cycloidal curve 77 or if these crankarms are shorter than the pitchradius, a prolate cycloid is generated and if they are longer, a curtate cycloid with a loop will be traced. On the right side of FIG. 11 the same communication passages are shown in a developed view as shown in FIGS. 9 and 10. This 3-piston engine is a self starting one because one of the pistons 66 is always in a position to receive the fluid pressure which starts the rotation. In FIG. 11 the upper piston 66 is shown to receive the fluid power from the inlet port 75 to start the rotation which in this illustration is the upward motion of cylinder block 61 which mounts all the gears 64.

More than three cylinders could be used for FIG. 11 without changing the control stator CS or distributing stator DS but more than three gears 64 cannot be used on same diameter control stator or bevel gear CS. For providing the working clearance for gears 64, they have to be grouped in a way that they mesh on smaller and larger diameters of the bevel gear CS which means gear CS has to have a wide face or more than one track.

Figure 13:
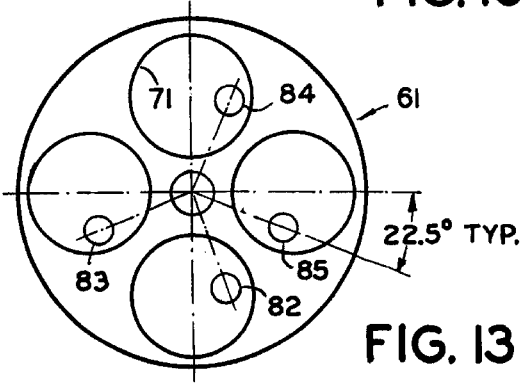
FIG. 13 is showing the relationship of communication ports for the 4-cylinder steam engine of FIG. 12.
Figure 12:
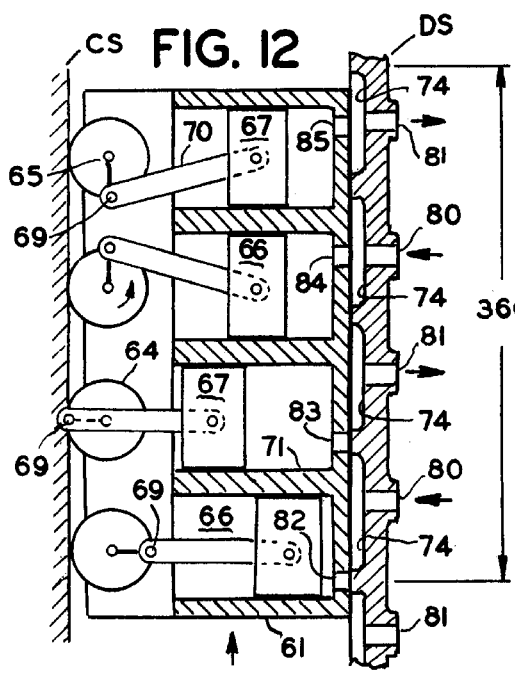
FIG. 12 is a developed schematic illustration of a 4-cylinder steam engine or pump.

In FIG. 12 a 2:1 gear ratio is used between control stator CS and gears 64 which allows the use of up to five cylinders with gears 64 on one track of the bevel gear CS. For the 2:1 ratio the distributing stator DS will have two opposing 90° inlet 80 and outlet passages 81. For a self-starting model the four pistons; 66 for power receiving and 67 for outlet, in FIG. 12 have a two-group phasing which means that the lower two crankpins 69 are following one cycloidal path and the upper two another one with a 90° phasing relationship. Instead of the centered ports 72 and 73 in FIGS. 9 and 10, the ports in FIGS. 12 and 13 are arranged in two groups 90° apart to match the 90° grouped relationship of crankpins 69. The port holes 82 and 83 in FIG. 12 are closed and the crank pins 69 are in the deadcenter position allowing no energy conversion but ports or holes 84 and 85 are in an open passage position which allows the inlet pressure from port 80 to hole 84 to start the motion of piston 66 and crankpin 69 which starts turning its gear 64 in a counterclockwise direction to move the cylinder block upwards which in a real model will be the rotation of shaft OS.

In FIG. 13 the four cylinders 71 are shown equally spaced but the ports 82–85 have a 22.5° typical offset which means hole pairs 82,83 and 84,85 are 90° apart but holes 82 and 85 are 45° apart while holes holes 83 and 84 are 135° apart. If five cylinders are used instead of the four in FIGS. 12 and 13, the crankarms can have a 72° relationship and cylinder holes can be centered. This odd cylinder number like in FIG. 11 will place one of the pistons always off from the deadcenter position which allows self starting from any position of shaft OS.

All the external pressure engines can include a reversing feature which really means a phasing shift between the control stator CS and distributing stator DS. For the 1;1 gear ratio models in FIGS. 9–11 a 180° phasing shift is required while for the 2:1 ratio models with any number of cylinders, a 90° phasing shift is used. In practical terms this means the rotation of the control stator CS or distributing stator DS 180° for the 1:1 ratio models and a 90° rotation for the 2:1 ratio models. Instead of the phasing or reversing rotation of the distributing stator DS, a flow direction or switching between the inlet and outlet sorts 75 and 76 in FIGS. 9 and 10 or between ports 80 and 81 in FIG. 12 can be used. A self starting and reversing feature is used in some existing steam engines like the locomotives where two steam cylinders have a 90° crank offset but the reversing and steam valve control linkage then is rather complex, costly and heavy as compared to the simple self starting, reversing and port communication control in the present invention. All the versions in FIGS. 9–12 can be used as pumps or compressors if operating shaft OS is functioning as a power input shaft.

Figure 14:
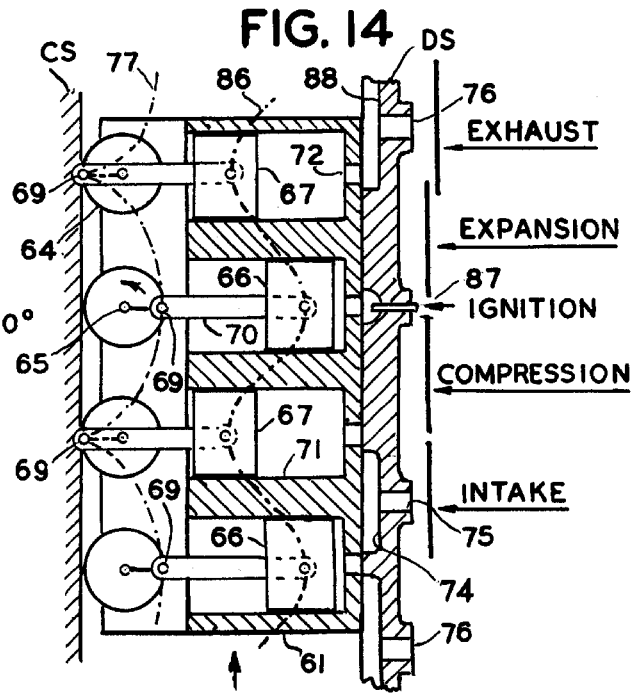
FIG. 14 is a similar illustration to FIG. 12 but arranged to an internal combustion Otto-cycle operation.

In FIG. 14 a 4-cylinder internal combustion Otto-cycle operation is illustrated where a single cycloidal crankpin path 77 is shown which means opposing cylinder pairs 66 and 67 reciprocate in unison. In this illustration an harmonic-motion-like path 86 of piston pins is also shown in dotted lines. All the cylinders in FIG. 14 are shown in their dead center position where after a few degree starting motion the lowermost one starts the intake or suction cycle from the intake port 75 during the following 90° rotation of shaft OS or during a 180° rotation of crankpin 69. All the cylinder holes 72 will now communicate with the hole pattern in the distributing stator DS which is different than previously described ones. After the 90° intake from port 75 a 90° compression and a 90° expansion or power stoke will follow where hole 72 stays closed. The ignition point inbetween can be a spark plug or a fuel injection point 87 for high compression ignition in Diesel engines. After the expansion the burnt gases will exit through the exhaust port 76 whereby the exhaust passage 88 could be extended beyond 90° which corresponds to the customary longer valve timing in ordinary engines. This internal combustion engine can function also as an engine with a-different cylinder number starting from one to any other practical higher cylinder number.

Axial Piston Models with Rotating Cylinders

In FIGS. 15–18 a 4-cylinder rotating pressure chamber internal combustion engine model is illustrated where the axial rotating piston motion is generated similarly to FIGS. 1 and 9 and the 4-cylinder schematic illustration of FIG. 14 is applied. The power output shaft OS in this case is rotatably supported by ball bearings 90 and 91 in control stator CS and distributing stator DS which are secured to a U-shaped base 10. A shaft oil seal 92 and another seal 93 on the cup-shaped cover 62 makes possible to use a partly oil filled crank case for piston lubrication. Basically, the axial motion generation in FIG. 15 is similar to FIG. 9 but there is a 2:1 ratio between gears 64 and the control stator bevel gear CS, which is clamped to an end plate 94 by means of a clamp 95. For this 4-piston model the distributing stator DS has a hole pattern as shown in FIGS. 14, 17 and 18. Each of the four pistons 66 with connecting links 70 has a similar construction as found in ordinary piston engines but instead of a single heavy crankshaft, each piston is linked to a crankpin 96 which is secured to the bevel gear 64 and to another balanced crank arm 97 whereby these crank assemblies have bearing studs 98 and 99 in split bearing holes in cylinder block 61 and in mating outer and inner bearing halves in a ring 100 and a block 101 which are screwed together for a convenient assembly of all the four preassembled piston, connecting link and gear-crank sub-assemblies. The connecting links or piston rods 70 could have a split bearing connection to crank pins 96 but a pressed together crank assembly without the split bearing is illustrated. In FIG. 16 only two of these crank assemblies are shown in their half or split bearing holes to make the cylinders 71 with their communication holes 72 more visible. The rotating cylinder block 61 has angular fins 102 for a good cooling air flow through a U-shaped cover 103 which has air exit slots 104 and which is secured to an end disk 105 and to the U-shaped base 10 by means of screws 106.

In this model a face-to-face or axial communication is illustrated where the equally spaced rotating cylinder holes 72 are communicating with the internal combustion engine hole pattern in distributing stator DS which was shown in a developed view in FIG. 14 and which is shown in an actual relationship in FIGS. 17 and 18 where the inlet port 75 spreads to the sector slot 74 for a 90° inlet communication while for the exhaust through port 76, the 90° communication slot 88 is increased to extend the exhaust timing. A tapped hole 107 is shown for a spark plug 87 or for an injection nozzle if a diesel cycle is used. Distributing stator Sate DS has two cooling air entrance holes 108 for a better air flow.

To insure a good leak tight face-to-face communication contact a pressure disk 110 is used which has bushings 111 entering to all the cylinder hales 72. A sealing or O-ring 112 could be used for each bushing 111 and a compression spring 113 is forcing disk 110 against the hole pattern in the distributing stator DS. In this 4-cylinder rotating pressure chamber internal-combustion engine the single spark plug 87 fires four times per revolution which means each of the four cylinders delivers a 90° power stroke to the output shaft OS during a revolution of it.

The single acting internal combustion engine in FIGS. 15 and 16 can be converted to a double acting external pressure or steam engine where the only difference is the distributing stator DS with a different hole pattern. In FIG. 19 two opposing inlet ports 80 and two opposing outlet ports 81 are shown which spread to sector slots 74 to permit a 90° opposing communication flow for a double inlet and double outlet pressurized fluid. For these engines the unsymmetrical cylinder hole pattern of FIG. 13 and the grouped 90° crank offset of FIG. 12 can be used for self starting engines. The hole pattern in FIG. 19 can be also used for pumps when operating shaft OS will function as a power output shaft. In this case, this means that the energy conversion works in the opposite way: the rotary power input energy will be converted to a fluid pressure energy.

In FIG. 20 the distributing stator DS is modified for a gas pressure compressor where a stationary or vehicular air conditioning compressor is a good example. While same hole pattern of FIG. 19 could be used here, in FIG. 20 the outlet ports 114 are round holes coming in an outlet communication at the end of the gas compression when the pressure is reaching about the pressure in a gas storage container. This eliminates all the inlet and outlet valves as found in ordinary compressors. In a typical swash-plate-type vehicular air compressor with three double acting pistons, for instance, 12 reed valves are required.

Axial Piston Models with Stationary Cylinders

In FIGS. 21–28 a stationary cylinder block 61, functioning as base 10, is illustrated with same flexibility of converting the basic structure to engines or pumps with minor modifications. Referring to FIGS. 9–14 again where the cylinder block 61 is a rotating member, it is easy to visualize a reverse action: the cylinder block 61 is stationary and the control stator CS and the distributing stator DS are the rotating members. Therefore in FIG. 21 they/can be called a control rotor CR and a distributing rotor DR, both keyed to the operating shaft OS which is rotatably supported by ball bearings 90 and 91. Similarly to FIG. 15 split bearing holes in housing 61 and in a cup-shaped cover or housing half 100 and in the inner half-bearing block 101 are rotatably supporting the bevel gears 64 with their crankpins 96 to provide the piston reciprocation. Housing half 100 can be first screwed to the cylinder block 61 by means of screws 115 and for additional strength four mounting holes 116 between cylinders can be used for bolting this cylinder housing for a face mounting of a horizontal or vertical engine.

In FIGS. 21,24 and 25 a radial communication rotating distributing rotor DR is shown which has a loose or floating keyed connection to shaft OS. In FIG. 21 a pin and slot 117 connection is illustrated. The inlet port 75 in this case stays in contact with an annular groove 118 which has a connection passage to the 90° communication segment 74 to communicate successively with the cylinder holes 72 while the exhaust port 76 can be a central one to receive the exhaust gases from a central hole 119 which is in contact with the exhaust segment 88 which in turn provides a successive exhaust communication with cylinder holes 72, If this engine is used as an external pressure engine or a pump, segments 74 and 88 are opposingly doubled as shown in phantom lines in FIG. 25. by designations 124 and 125.

In FIGS. 21–23 each cylinder 71 has its own spark plug 87 which can be again an injection nozzle for diesel engines. The successive timing for ignition is about on the dead-center position for each cylinder after the compression as shown in FIG. 14. In FIGS. 22 and 23 a face-to-face communication is shown which is similar to FIG. 15 but instead of a stationary distributing stator DS a rotating distributing disk DR is used which is keyed to shaft OS by means of a floating pin 117 and slot fit whereby the compression spring 113 is used again to force the pressure disk 110 against the distributing disk DR and both against a cover 120 which is secured to cylinder block 61 for an easy assembly and servicing similarly to the radial distributing rotor. The distributing rotor DR in FIGS. 22 and 23 can have a hole pattern suited for different engine or pumping models. In FIGS. 26 and 27 the details of a 3-level disk DR are shown for an internal combustion engine Otto-cycle operation. A fuel input segment 121 has a through hole to connect this segment to an annular groove 122 which is in full communication with the inlet port 75 while an exhaust segment 123 is open to the outside diameter of disk DR which provides a passage for exhaust gases to a cylindrical clearance around the disk DR and to the exhaust port 76. This means that the rotating disk DR is providing successive communication passages to all four cylinder holes 72 while the rotating bevel gear or control rotor CR with a proper mesh with crank gears 64 maintains the synchronization of piston motion and distributing rotor DR.

Similarly to FIGS. 24 and 25 disk DR can have opposing inlet and outlet segments 124 and 125 (shown in phantom lines) for the double acting external pressure engines or pumps. In FIG. 28 disk DR is shown with smaller outlet segments 126 and 127 for compressors which allow a pressure buildup before exit similarly to the stationary hole pattern in the distributing stator DS in FIG. 20.

Conclusion

All the axially controlled central-axis illustrated models in the present invention have a compact cylindrical shape and construction similar to electric motors, but the illustrated samples for vane-type and piston-type versions have differences or advantages and disadvantages which determine their suitability for a large number of applications in a wide size range. There is a flexibility of using them for internal combustion or external pressure (steam) engines where the pressure energy is converted to a shaft rotation or in a reverse manner where a powered shaft rotation is converted to pumping or compressed gas pressure.

The selected illustrations demonstrated that the axial bevel gear control method is very similar in vane-type and piston-type energy converters despite a different pressure chamber shape. In both cases stationary and rotating main pressure chambers can be used which require flow communication methods with different communication hole patterns for handling the fluid pressure energy conversion in engine and pumping applications.

In the central-axis vane-type versions of the present invention and in our U.S. Pat. No. 5,501,182, where many more similar control and pressure chamber options are described, the highest comparative volumetric efficiency is possible which is further influenced by the peristaltic step factor P. For an average 3-liter vehicular engine in the internal combustion engine group, the 183 $IN^3$ two revolution displacement figure for one shaft revolution is 91.5 $IN^3$ and if R=4.4 inches and r=2 inches (see FIG. 6), then the displacement volume for the toroidal pressure chamber with P=1 is:

$$2.47(R+r)(R-r)^2 = 2.47(4.4+2)(4.4-2)^2 = 91.5 \text{ IN}^3$$

The outside diameter of this engine could be about 10.5 inches and the length will be about same for FIG. 5 and slightly longer for FIG. 1. For square or rectangular vane models these overall sizes will be even less.

In the illustrated piston engines the highly developed piston-in-cylinder technology is applicable but the overall size will be somewhat larger than in our vane-type engines. In our 4-cylinder axial piston engine all the 4 cylinders deliver one power stroke per revolution and then a cylinder working volume for the 3-liter engine will be 91.5:4=22.9 $IN^3$. If now an equal piston stroke and diameter is selected, the piston diameter and stroke will be 3.1 inches and then the outside diameter of this engine will be 12 inches and length 16 inches. Though these overall sizes of this engine are not much higher than in our vane-type engine, the overall volume and weight still are about 1.8 times higher. On the other hand our axial piston engine still has a considerable size and weight advantage as compared to ordinary piston engines. The contributing factors for this considerable size reduction in all cases are the comparatively simpler and more compact power transmission gear and the valveless communication which in vane-type engines is directly between sealing members (piston rings 44) and the distributing hole pattern and in axial piston models between cylinder holes 72 and a stationary or rotating distributor. Also, the possibility of using air cooling, especially the angular cooling fins in rotating pressure chamber models, will eliminate all the water cooling components.

Thus all the selected illustrations in this invention include slightly modified axial motion control methods to create variable volume pressure chambers for a pressure to rotary or rotary to pressure energy conversion useable for a large number of applications. It is to be understood that all the specified and illustrated most typical options can be put in practical use by those skilled in the art. Therefore we do not intend to be limited to the details shown and or described but rather intend to cover all the changes and modifications encompassed within the scope of the appended claims.

We claim:

1. A rotary central-axis unidirectional av converter for engines and pumps comprising:

a base member (10);

an operating shaft (OS) including a crankarm;

a first rotor concentric with said operating shaft including a first vane carrier ($V_1$) with first vanes and a first side gear (27);

a second rotor concentric with said operating shaft including a second vane carrier ($V_2$) with second vanes and a second side gear (28);

a round main pressure chamber divided into revolving variable volume subchambers between said first and second vanes;

a limited angle bevel-gear-type differential gear with its reversing gear (29) rotatably mounted to said crankarm and said reversing gear being in mesh with said first and second side gears;

a crankpin (38) on said reversing gear forced to follow a peristaltic control wave which is causing said first and second rotors to alternately accelerate and decelerate for changing the volumes in said subchambers between said vanes while said vanes are in a variable speed rotary motion and a distributing stator with a communication hole pattern having a synchronized relationship with said first and second vanes to effect a fluid flow and energy conversion between a fluid pressure and a powered rotation when said vanes are in motion.

2. A rotary energy converter of claim 1 wherein said main pressure chamber has a toroidal shape and said first and second vanes in said main pressure chamber have a round shape with piston ring sealing.

3. A rotary energy converter of claim 1 wherein said main pressure chamber has a cylindrical shape and said first and second vanes in said main pressure chamber have a rectangular shape.

4. A rotary energy converter of claim 1 wherein said peristaltic control wave is generated and controlled by a four-bar-linkage parallel and rotating with said operating shaft while an axially reciprocating connecting link (39) in said four-bar-linkage is linking said oscillating crankpin (38) on said reversing gear to a rotating crank pin (37) on a bevel gear (36) which is in mesh with a concentric stationary bevel gear (CS) with a gear ratio equalling the number of said vanes on each of said vane carrier.

5. A rotary energy converter of claim 1 wherein said peristaltic control wave is built into an axial barrel-type cam groove (50) to receive and control the oscillation of said crankpin or cam follower (51) on said reversing gear whereby the number of said oscillations during a revolution of said operating shaft equals the total number of said vanes in said main pressure chamber.

6. A rotary energy converter of claim 1 wherein a yoke (54) on a hollow shaft (26) is concentrically linking said first vane carrier ($V_1$) to said side gear (27) while said second vane carrier ($V_2$) is secured directly to said second side gear (28).

7. A rotary energy converter of claim 1 functioning as an external pressure engine with N number of vanes on each of said vane carrier wherein said revolving subchambers are communicating with said hole pattern which includes N number of inlet and N number of outlet ports alternately located on said distributing stator for effecting a pressure to rotary energy conversion by means of the external pressure in said subchambers which is translated to a uniform rotation of said operating shaft by means of said limited angle differential gear.

8. A rotary energy converter of claim 1 functioning as an internal combustion engine with N number of vanes on each of said vane carriers wherein said revolving subchambers are communicating with said hole pattern which includes N:2 number of inlet ports, N:2 number of exhaust ports and N:2 number of ignition means located on said distributing stator in a way to provide the common Otto-cycle operating steps of intake, compression, ignition, expansion and exhaust, whereby expansion is taking place in a subchamber where said first and second vanes are in their closest position and the powered volume increase in this subchamber is causing said vane acceleration-deceleration which is transmitting said expansion power through said limited angle differential gear to a uniform rotation of said operating shaft.

9. A rotary energy converter of claim 1 functioning as a pump with N number of vanes on each of said vane carrier wherein said revolving subchambers are communicating with said hole pattern which includes N number of inlet and N number of outlet ports alternately located on said distributing stator for effecting a rotary to pressure energy conversion by means of said revolving subchambers where volume changes are cooperating and synchronized with said inlet and outlet ports to cause a pumping action by means of said limited angle differential gear which is translating a uniform powered rotation of said operating shaft to a pumping action of fluids from said inlet ports to said outlet ports.

10. A rotary central-axis energy converter for engines and pumps comprising:

a base member (10)

an operating shaft (OS);

a number of axially reciprocating pistons (66) in cylinders (71) parallel to said operating shaft;

a first bevel gear (64) with a crankpin (69) for each of said pistons rotatably mounted at right angles to said operating shaft;

a connecting rod (70) connecting each of said pistons to said crankpin on said first bevel gear;

a second bevel gear concentric with said operating shaft and in mesh with said first bevel gears;

a distributing member with a communication hole pattern providing a synchronized fluid flow between holes in said cylinders and inlet and outlet ports associated with said distributing member for effecting an energy conversion between a fluid pressure and a powered rotation of said operating shaft.

11. A rotary energy converter of claim 10 wherein said first and second bevel gears have a 1:1 ratio, the number of said pistons is 1 or more and said distributing member has flow passages to allow an alternating 180° fluid flow between said holes in said cylinders and said inlet and outlet ports in said distributing member.

12. A rotary energy converter of claim 11 wherein the number of said pistons is 3 with a 120° spacing and with a 120° spacing of said crankpins which allows at least one of said flow passages be open to provide a self starting feature for an external fluid pressure engine.

13. A rotary energy converter of claim 10 wherein said first and second bevel gears have a 2:1 ratio, the number of said pistons is 1 or more and said distributing member has flow passages to allow an alternating 90° flow between 2 opposing inlet and 2 opposing outlet ports in said distributing member and said holes in said cylinders.

14. A rotary energy converter of claim 10 wherein said energy converter is functioning as a 4-cylinder external fluid pressure self starting engine with a 2:1 gear ratio between said first and second bevel gears whereby two pairs of said first bevel gears have a 180° crankpin relationship and a 90° relationship between said two pairs while said holes in said cylinders also have a two pair hole pattern but 90° apart in each pair and a 45° relationship between said hole pairs; said crank-arm pair and said hole pair relationship keeps at least one of said pistons in said cylinders in an open fluid flow position for converting the pressure energy to a power rotation of said operating shaft in a selected direction.

15. A rotary energy converter of claim 10 wherein said energy converter is functioning as a reversible external fluid pressure engine with a 1:1 gear ratio between said first and second bevel gears and a 180° phasing shift is used between said second bevel gear and said distributing member to provide said reversibility.

16. A rotary energy converter of claim 10 wherein said energy converter is functioning as a reversible external fluid pressure engine with a 2:1 gear ratio between said first and second bevel gears and a 90° phasing shift is used between said second bevel gear and said distributing member to provide said reversibility.

17. A rotary energy converter of claim 10 wherein said energy converter is functioning as a reversible external fluid pressure engine and said reversibility is provided by a fluid flow reversal in said inlet and outlet ports.

18. A rotary energy converter of claim 10 wherein said cylinders for said pistons are keyed to said operating shaft while said second bevel gear and said distributing member are stationary whereby said distributing member is functioning as a distributing stator (DS) with said communication hole pattern.

19. A rotary energy converter of claim 10 wherein said cylinders with said pistons are stationary while said second bevel gear and said distributing member are keyed to said operating shaft whereby said distributing member is functioning as a distributing rotor (DR) with said communication hole pattern which provides successive fluid connecting passages between said cylinder holes and inlet and outlet ports.

20. A rotary energy converter of claim 19 wherein said distributing rotor has a cylindrical shape with radial communication passages including said hole pattern consisting of inlet and outlet segments in communication with said cylinder holes (72) and a connecting passage from said inlet segment (74) to a groove (118) which is in a full communication with said input port (75); and another communication passage from said outlet segment (88) to a central hole (119) in said distributing rotor which is in a full communication with said outlet port (76).

21. A rotary energy converter of claim 19 wherein said distributing rotor has a disk shape with a face-to-face communication passages including said hole pattern consisting of inlet and outlet segments in communication with said cylinder holes (72) and a connecting passage from said inlet segment (121) to a groove (122) in a full communication with said inlet port; and another connecting passage from said outlet segment (123) to a closed annular chamber in connection with said outlet port.

22. A rotary energy converter of claim 21 wherein a pressure plate (110) between said cylinder block and said distributing rotor has bushings in said cylinder holes to provide an axial sliding sealed fit in said cylinder holes while said pressure plate is spring biased against said distributing rotor and a cover plate (120) of said cylinder block whereby said cover plate includes said inlet and outlet ports.

23. A rotary energy converter of claim 10 functioning as an internal combustion engine with a rotating cylinder block and with a distributing stator (DS) having said hole pattern with an intake and an exhaust port providing a 90° intake and a longer than a 90° exhaust communication next to each other whereby an ignition point is located between said intake and exhaust ports.

24. A rotary energy converter of claim 10 functioning as an internal combustion engine with a stationary cylinder block and with a distributing rotor (DR) having said hole pattern associated with said intake and exhaust port to provide a 90° intake and a longer than a 90° exhaust communication next to each other whereby each of said cylinders has its own ignition point for a spark or compression-injection ignition timed between the 90° compression and 90° expansion strokes and controlled by said operating shaft which is functioning as a power output shaft.

25. A rotary energy converter of claim 10 wherein said operating shaft is functioning as a power output shaft of a fluid pressure engine whereby said fluid pressure is applied to said pistons which are causing the rotation of said power output shaft.

26. A rotary energy converter of claim 10 wherein said operating shaft is functioning as a power input shaft of a pump whereby the reciprocating motion of said pistons is causing a pumping action or a pressurized fluid flow through said inlet and outlet ports when said power input shaft is rotated.

27. A rotary energy converter of claim 10 is functioning as a gas compressor with a 1:1 gear ratio between said first and second bevel gears, the number of said pistons being 1 or more and said distributing member has a 180° fluid inlet flow passage to a suction causing piston and a considerably smaller than a 180° outlet passage to provide a delayed outlet opening after a gas compression buildup in a cylinder with a returning piston.

28. A rotary energy converter of claim 10 is functioning as a gas compressor with a 2:1 gear ratio between said first and second bevel gears, the number of said pistons being 2 or more and said distributing member has a 90° double opposing gas inlet flow passage to two suction causing pistons and a considerably smaller than 90° double opposing compressed gas outlet passages to provide delayed outlet openings after a gas compression buildup in cylinders with returning pistons.

* * * * *